Jan. 4, 1938. W. RAISCH 2,104,526
APPARATUS FOR TREATING MATERIAL INCLUDING SOLIDS AND VAPORIZABLE MATERIAL
Filed Sept. 5, 1936

INVENTOR
William Raisch
BY
Louis L. Ansart
his ATTORNEY

Patented Jan. 4, 1938

2,104,526

UNITED STATES PATENT OFFICE 2,104,526

APPARATUS FOR TREATING MATERIAL INCLUDING SOLIDS AND VAPORIZABLE MATERIAL

William Raisch, New York, N. Y., assignor to Underpinning & Foundation Co., Inc., New York, N. Y., a corporation of New York Application September 5, 1936, Serial No. 99,628

8 Claims. (Cl. 110—12)

The present invention relates more particularly to an apparatus and a process for treating material, sewage sludge or screenings for example, comprising solids and volatile material or moisture by subjecting the material to heat in early stages of operation to drive off the moisture and volatile matter and then subjecting the dried material to higher temperature to burn or roast the same.

Important objects of the invention are to provide a novel and advantageous apparatus and a novel and advantageous process for carrying out treatment of the general character specified. An important feature resides in drying the material in a plurality of drying zones and then burning it in a plurality of burning zones, communication between the last drying zone and the first burning or roasting zone being effected through a device serving as a valve and controlling the rate of discharge from the drying section to the burning section, as well as maintaining a substantially gas-tight seal between the drying and burning sections.

In carrying out the invention in a preferred manner, use is made of a furnace having a plurality of generally horizontal hearths spaced apart in a vertical direction and having discharge openings at the centers and peripheries of alternate hearths so that the material introduced on the uppermost hearth may be rabbled inwardly and outwardly over successive hearths to the respective outlets and gradually worked down to the lowermost hearth and then discharged from the furnace.

A hearth having a peripheral outlet may be used to divide the furnace into an upper or drying section and a lower or burning section, the furnace at the section-separating hearth being provided with a controlling device whereby the rate of flow of material from the upper section to the lower may be regulated and a substantial gas-tight seal may be maintained between the sections. This feature is of great importance. In each of the sections there may be a plurality of hearths and no provision may be made to control the passage of gases through the discharge openings of the various hearths above and below the section-separating hearth.

In a preferred embodiment, the regulating device may take the form of two screw conveyors at the side of the furnace and arranged one above the other so that the upper one may take material from the outlet of the section-separating hearth and feed it outwardly to a discharge opening where it drops into the lower conveyor and the conveyor may move it inwardly and discharges it so as to fall on the next hearth. The screws of the conveyors may be operated simultaneously by gear connections or other suitable connections and by varying the speed of operation of the conveyor screws the conveyor casings may be kept full enough to maintain a gas seal.

By maintaining an effective gas seal between the drying section and the burning section, it is made feasible to control the passage of air and gases through each section independently of the other section.

Other objects, features and advantages will appear upon consideration of the following description and of the drawing in which.

Figure 1:
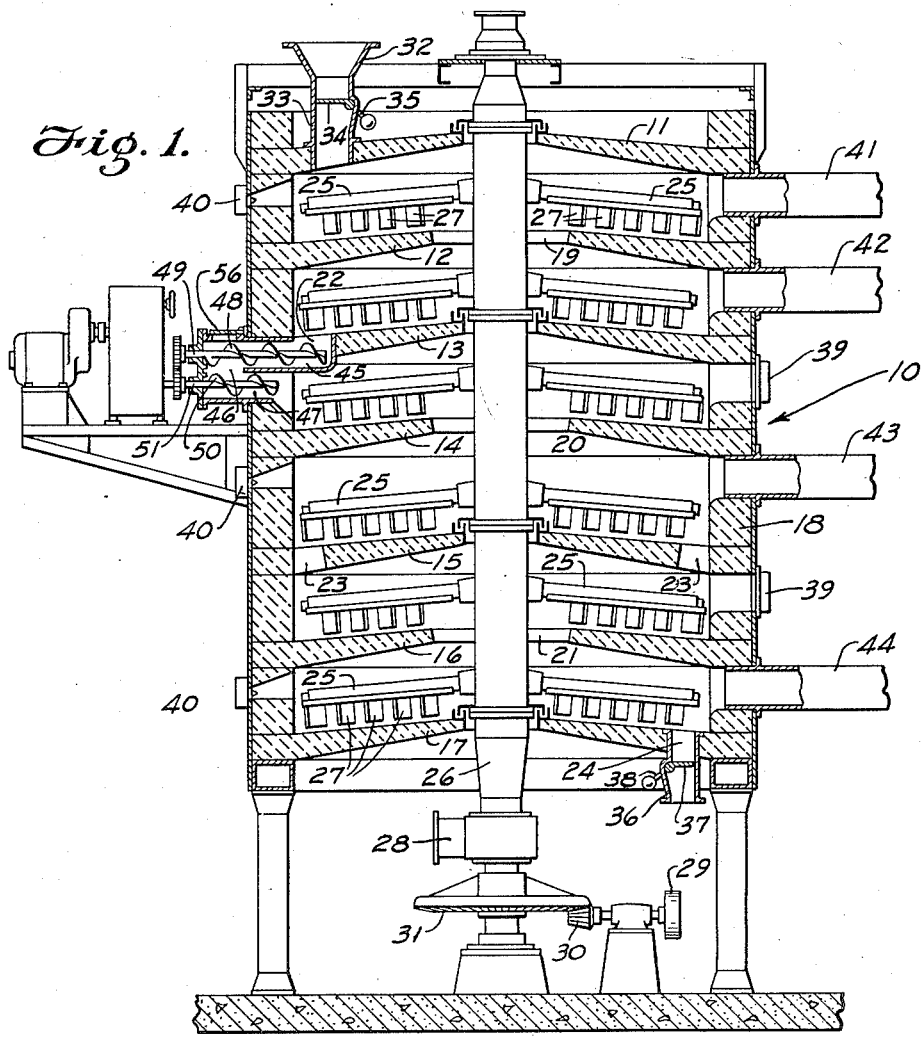
Fig. 1 is a vertical section through the vertical axis of the furnace.
Figure 2:
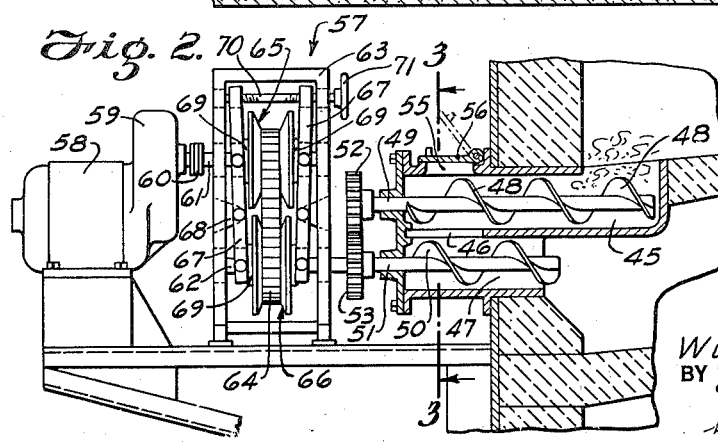
Fig. 2 is a fragmentary view, on a larger scale, of a part of the structure shown in Fig. 1.

Referring to the drawing, there is disclosed a furnace 10 having a top 11 and a plurality of hearths 12, 13, 14, 15, 16 and 17 spaced vertically from each other and supported by the peripheral wall 18 of the furnace. Hearths 12, 14 and 16 have central discharge openings 19, 20 and 21 respectively, and the other hearths 13, 15 and 17 have at their peripheries one or more discharge openings 22, 23 and 24, respectively. Associated with each hearth there may be one or more radially extending rabbling devices 25 supported or driven by a vertical hollow shaft 26 located substantially at the axis of the furnace and passing through the central portions of the central discharge openings 19, 20 and 21 of hearths 12, 14 and 16 and through gas-tight seals at the centers of top 11 and hearths 13, 15 and 17.

Each of the rabbling or rabble devices 25 is provided with blades 27 suitably inclined for different hearths so as to rabble the material toward the center or toward the periphery as required. Air may be supplied to the interior of the shaft 26 through a duct 28 at its lower end and the shaft may be driven by means including a pulley 29 receiving power from any suitable source, a bevel gear 30 secured to the same shaft as the pulley 29, and a larger bevel gear 31 secured on the shaft 26 and meshing with the gear 30.

The material to be treated may be charged through the top 11 through a hopper 32 and a chute 33, upward flow of air and gas being prevented, for example, by a pivoted gate or door 34 normally held in closed position by suitable counterbalancing means which may be in the form of a weighted arm 35. The arm 35 may be so weighted that it will hold the door 34 closed until a predetermined downward force is exerted thereon by accumulating material. Discharge of material through the outlet 24 in the lowermost hearth may also be through a chute 36 provided with a pivoted gate or door 37 normally held in closed position by a weighted arm 38.

Access to compartments above the various hearths may be obtained through doors 39 and heat may be supplied where desired through burners 40.

As disclosed, the furnace 10 is divided, into an upper preliminary or drying section and a lower final or burning section, by the hearth 13, draft for the drying section being provided through ducts 41 and 42 above the hearths 12 and 13, respectively, and draft for the burning section being provided through ducts 43 and 44 above the hearths 15 and 17, respectively. It will be seen that there is no definite provision for circulation of air and gases through the compartment above hearth 14, inasmuch as the material on the hearth 13 is fed therethrough in such a manner that a substantially gas-tight seal may be maintained at all times. In said compartment above hearth 14, the material may be partly burned but the temperature therein is much lower than it would be in the case of a direct flow of combustion gases therethrough.

The feeding of material through the outlet 22 in the hearth 13 may be effected in any suitable manner, as for example by feeding it through a duct and keeping the duct completely full of the material at one or more points so as to prevent the passage of any substantial amount of air or gas through outlet 22 in either direction. Preferably this is done by providing a conveyor duct 45 communicating at the upper side of its inner end with the outlet 22 and through an opening 46 at the lower side of its outer end, which may be at the outside of the furnace, with the outer end of an inwardly extending conveyor duct 47 which at its inner end discharges material into the compartment below the hearth 13 where it falls on the hearth 14.

Preferably the material is fed outwardly through the duct 45 by means of a conveyor screw 48 whose shaft 49 extends through the outer end of the duct 45 and is fed inwardly through the duct 47 by means of a conveyor screw 50 whose shaft 51 extends outwardly through the outer end of the duct 47. A driving connection between the conveyor shafts 49 and 51 may be effected through intermeshing gears 52 on the shaft 49 and 53 on the shaft 51.

Figure 3:
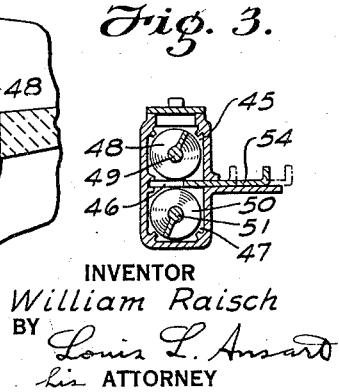
Fig. 3 is a section on the line 3—3 of Fig. 2.

The size of the opening 46 between the duct 45 and the duct 47 may be varied by adjustment of a slide 54 (Fig. 3) serving as a door or gate. At the upper side of the duct 45 and outside of the furnace, there may be provided an opening 55 normally closed by a gate or door 56 pivoted at one edge and normally held closed by its own weight. This door enables inspection of the interior of the conveyors and may also yield if the pressure in the upper duct becomes too heavy.

Preferably the conveyor ducts 45 and 47 are kept full by regulating the speed or rotation of the conveyor screws so the ducts 45 and 47 are kept substantially full. To this end the shaft 51 of the lower conveyor may be driven from a speed regulator or changer 57 driven from a motor 58 through a speed reducer 59. The output shaft of the speed reducer 59 may be connected through a flexible connection 60 with input shaft 61 of the speed changer 57. Output shaft 62 of the speed changer is in effect an extension of the conveyor shaft 51 and may be connected thereto directly or through a flexible connection not shown.

The speed changer 57 may be of any suitable form but as illustrated the shafts 61 and 62 are parallel and journaled in opposite sides of a frame 63. The speed changer also comprises a belt or chain 64 of V-section connecting an expansible pulley 65 on shaft 61 and an expansible pulley 66 on shaft 62. These expansible pulleys are of a type in which each pulley is made of two tapered heads which when pressed together act to increase the effective radius of the pulley and when moved apart decrease the effective radius of the pulley.

To vary the speed by means of the speed changer, it is necessary to increase the effective radius of one expansible pulley while decreasing the effective radius of the other. These changes may be effected through levers 67 pivoted on lugs 68 projecting from opposite sides of the frame 63. These levers 67 are also pivoted to members 69 associated with the heads of the pulleys so as to move the heads together or to separate them without interfering with the rotation of the pulleys. Simultaneous movement of the levers 67 may be effected by means of a member 70 journaled in the frame 63 and having a right hand screw cooperating with an extension of one of said levers 67 and a left hand screw cooperating with an extension of the other lever. The member 70 may be provided with a head 71 for turning the same.

In operation, material, such as sewage sludge or screenings, is charged into the uppermost compartment where it falls on the hearth 12 on which it is agitated and rabbled to the central discharge opening 19 where it falls to the hearth 13 and is rabbled outwardly to the outlets 22. In the same general manner it is rabbled back and forth over successive hearths until it is discharged through the lowermost hearth 17. While in the two compartments of the drying section set off by the hearth 13, the material is dried by pre-heated air or hot gases circulated through the corresponding compartments or zones by use of the ducts 41 and 42, any necessary increase in heating being obtained by the use of one or more burners 40.

Upon passing through the hearth 13 and the adjustable feeding device associated therewith the material enters the zone above the hearth 14, in which zone there is no definite induced draft. From this zone the material passes into the lower burning zones where it may be subjected to heating by one or more burners 40 and a draft of preheated air or hot gases by use of ducts 43 and 44 and draft inducing means such as a suction fan, not shown. Due to this method of inducing a draft, there will be a low pressure in the lower part of the furnace and some air will leak into the compartment just below the hearth 13 and will be drawn out at the bottom of the compartment, thus protecting the valve or conveyor mechanism from high temperatures. In the lower compartment, or zones the material will be completely burned.

It should be understood that various changes may be made and that certain features may be made without others, without departing from the true scope and spirit of the invention.

Having thus described my invention, I claim:
1. In a multiple hearth furnace, an interme- diate hearth dividing the furnace into an upper drying section and a lower burning section, means for transferring material from said intermediate hearth to the next lower hearth while preventing the passage of gas past said intermediate hearth in either direction, said transferring means including a duct, means for feeding material through the duct, and means for regulating the feed through the duct to keep the duct full.

2. In a multiple hearth furnace, a hearth dividing the furnace into an upper drying section and a lower burning section, an outlet for said hearth, a conveyor duct closely connected at one end with said outlet and having at its other end an outlet to discharge material passing to the burning section, a conveyor screw in said duct and means to vary the rate of rotation of said screw to keep the duct full of material.

3. In a multiple hearth furnace, a hearth dividing the furnace into an upper drying section and a lower burning section, an outlet through said hearth, a conveyor duct closely connected at one end with said outlet and having at its other end an outlet for material passing to the burning section, a conveying device in said duct and means for varying the effective size of the outlet of said conveyor duct to restrain discharge of material and keep the duct full to provide a substantially gas-tight seal.

4. In a multiple-hearth furnace, a hearth dividing the furnace into an upper drying section and a lower burning section, an outlet through said hearth, a conveyor duct closely connected at its inner end with said outlet and connected at its other end outside the furnace with a duct leading to the burning section, a conveying device in said duct, and a yieldably closed door at the outer end of the conveyor duct to be opened for inspection purpose and opening when the pressure of material thereagainst becomes excessive.

5. In a multiple-hearth furnace, a hearth dividing the furnace into an upper drying section and a lower burning section including a plurality of vertically spaced hearths and corresponding compartments, an outlet in the dividing hearth, a conveyor device including a duct connected with said outlet and a device for moving material through said duct, and means for inducing draft between the second compartment below the dividing hearth and the lowermost compartment of the burning section, thereby leaving the compartment below the dividing hearth relatively cool and avoiding damage to the conveyor device.

6. In a multiple hearth furnace, a hearth dividing the furnace into an upper drying section and a lower burning section, an outlet through the dividing hearth, and means for controlling the passage of material through said outlet including a conveyor duct connected at its inner end with said outlet and having at its outer end a downwardly directed outlet, a conveyor screw in said duct, a second conveyor duct receiving at its outer end material from the outlet of the other duct and at its inner end discharging material to the next lower hearth, and a conveyor screw in said second duct.

7. In a multiple hearth furnace, a hearth dividing the furnace into an upper drying section and a lower burning section, an outlet through the dividing hearth, and means for controlling the passage of material through said outlet including a conveyor duct connected at its inner end with said outlet and having at its outer end a downwardly directed outlet, a conveyor screw in said duct, a second conveyor duct receiving at its outer end material from the outlet of the other duct and at its inner end discharging material to the next lower hearth, a conveyor screw in said second duct, and means for closing the outlet at the outer end of the first-mentioned duct to restrict passage of material through the first-mentioned duct and also discharge to the second duct.

8. In a multiple-hearth furnace, a hearth dividing the furnace into an upper drying section and a lower burning section, an outlet through the dividing hearth, and means for controlling the passage of material through said outlet including a conveyor duct connected at its inner end with said duct and having at its outer end a downwardly directed outlet, a conveyor screw in said duct, a second conveyor duct receiving at its outer end material from the outlet of the other duct and at its inner end discharging material to the next lower hearth, a conveyor screw in said second duct, and adjustable driving means for said conveyor screws.

WILLIAM RAISCH.